United States Patent
ElSharif et al.

(10) Patent No.: US 10,325,049 B2
(45) Date of Patent: Jun. 18, 2019

(54) PLACEMENT-DRIVEN GENERATION OF ERROR DETECTING STRUCTURES IN INTEGRATED CIRCUITS

(71) Applicant: International Business Machines Corporation, Armonk, NY (US)

(72) Inventors: Ashraf ElSharif, Austin, TX (US); Kenneth Douglas Klapproth, Austin, TX (US); Jason D. Kohl, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 52 days.

(21) Appl. No.: 15/408,449

(22) Filed: Jan. 18, 2017

(65) Prior Publication Data
US 2018/0203968 A1    Jul. 19, 2018

(51) Int. Cl.
G06F 17/50    (2006.01)

(52) U.S. Cl.
CPC ........ G06F 17/5045 (2013.01); G06F 17/505 (2013.01); *G06F 2217/70* (2013.01)

(58) Field of Classification Search
USPC ....................................................... 716/102
See application file for complete search history.

(56) References Cited

U.S. PATENT DOCUMENTS

| | | | |
|---|---|---|---|
| 7,568,130 B2 | 7/2009 | Smith et al. | |
| 7,590,965 B1 | 9/2009 | Ingoldby et al. | |
| 8,589,841 B2 | 11/2013 | Arbel et al. | |
| 2005/0073345 A1 | 4/2005 | Schneider | |
| 2005/0204274 A1 | 9/2005 | Kamp et al. | |
| 2007/0226600 A1* | 9/2007 | Ogawa | G06F 11/1008 714/798 |
| 2009/0183129 A1 | 7/2009 | Seigler et al. | |
| 2014/0189619 A1 | 7/2014 | Willis | |

* cited by examiner

*Primary Examiner* — Bryce M Aisaka
(74) *Attorney, Agent, or Firm* — Cantor Colburn LLP; William Kinnaman

(57) ABSTRACT

According to one or more embodiments, a method for adding parity protection for any uncovered latches of a circuit design is provided. The method includes determining latches that are not covered by current parity protection of the circuit design to output a list of the uncovered latches. The method includes executing a clustering operation that iteratively generates latch groupings according to physical design information and clock gating domains, and that outputs an updated design incorporating the latch groupings. Note that each latch grouping generates a corresponding parity bit to provide the parity protection to minimize adverse impacts on timing, routing, and power consumption of the circuit design. The method also includes adding the updated design with the parity protection to the circuit design to generate a final hardware design.

20 Claims, 3 Drawing Sheets

PLACEMENT-DRIVEN GENERATION OF ERROR DETECTING STRUCTURES IN INTEGRATED CIRCUITS

BACKGROUND

The disclosure relates generally to placement-driven generation of error detecting structures in integrated circuits, and more specifically, to adding parity protection to control logic latches using physical design feedback to cluster unprotected latches into groups.

In general, conventional computing systems provide some level of error protection of single event upsets in order to ensure data integrity, to prevent the conventional computing systems from entering an illegal state, and to control resource availability. To this end, data is protected by parity or error-detecting/correcting mechanisms, and control latches can be protected with parity protection. It is preferred that any non-functional additions to an integrated circuit, such as those for error protection, have a minimal impact on timing, power consumption, and space, so as to not detract from the overall performance of the conventional computing systems. However, the error protection by the conventional computing systems is far from being optimized to ensure this minimal impact.

SUMMARY

According to one or more embodiments, a method for adding parity protection for any uncovered latches of a circuit design is provided. The method comprises determining, by a processor connected to a memory, latches that are not covered by current parity protection of the circuit design to output a list of the uncovered latches. The method comprises executing, by the processor, a clustering operation that iteratively generates latch groupings according to physical design information and clock gating domains, and that outputs an updated design incorporating the latch groupings. Each latch grouping generates a corresponding parity bit to provide the parity protection to minimize adverse impacts on timing, routing, and power consumption of the circuit design. The method comprises adding, by the processor, the updated design with the parity protection to the circuit design to generate a final hardware design.

According to one or more embodiments, the method can be implemented as a system and/or a computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Figure 1:
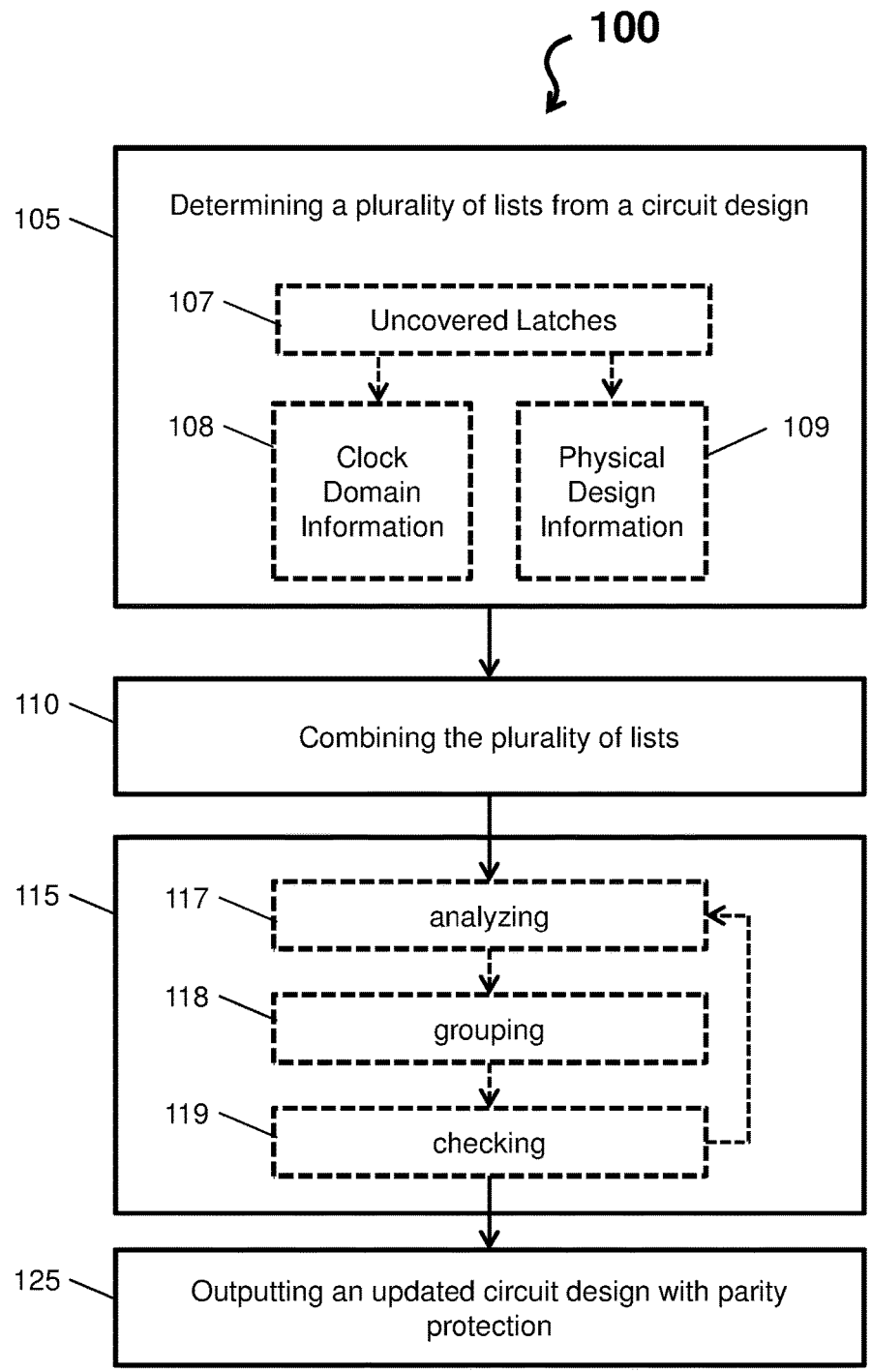
FIG. 1 depicts a process flow of placement-driven system in accordance with one or more embodiments.

Embodiments disclosed herein may include placement-driven system, method, and/or computer program product (herein placement-driven system) that implements placement-driven generation of error detecting structures in integrated circuits. In a non-limiting embodiment, the placement-driven system adds parity protection to miscellaneous control logic latches using physical design feedback, such as placement, timing and congestion information, to cluster unprotected latches into groups. The technical effects and benefits of embodiments of the placement-driven system, thus, include a minimizing of the adverse impacts on the circuit's timing/utilization. Embodiments described herein are necessarily rooted in the processor of the placement-driven system to perform proactive operations to overcome problems specifically arising in the realm of error protection. These problems are now further described with reference to conventional computing systems.

Conventional computing systems provide error protection by adding XOR gates and wires, storing a parity bit, and comparing the parity of the latch inputs to the parity of the latch outputs. Adding XOR gates and wires for generation and checking can have a negative impact on congestion and usage of space and on timing-critical paths. Adding the latches to hold the parity bits requires space on an integrated circuit and additional power. If enough latches are present, more than one parity bit will be needed in order to avoid a prohibitively large XOR tree, which has a negative impact on circuit timing. Fewer but larger XOR trees would also decrease the probability that an error will be detected in the event that two (or another even number of) errors occur. It is important that any parity generation and error checkers do not include latches in multiple clock gating domains, as this can create false positives or false negatives in error reporting, and waste power if parity latches are clocked unnecessarily. Thus, the error protection by conventional computing systems does not minimize wiring by providing more efficient groupings, and fails to provide minimal impact on timing, power consumption, and space, and therefore detracts from the overall performance of the conventional computing systems.

Turning now to an overview of aspects of the placement-driven system, embodiments of the placement-driven system implement automated operations for taking a design in a hardware description language (HDL) and corresponding layout information, and adding parity protection for any unprotected latches by considering the layout and clock gating domains to minimize the negative impacts that the additional elements would create for the design as a whole. To this end, the unprotected latches are automatically grouped to reduce the total length of wires required to connect all of the latch inputs and outputs to the XOR gates that will generate the parity bit and check the parity bit, respectively. The technical effects and benefits of embodiments of the placement-driven system, thus, also include reducing or eliminating an amount of human effort required to choose appropriate groups and to write the HDL that will describe the new logic. Note that the placement-driven system can be an electronic, computer framework comprising and/or employing any number and combination of processing systems (e.g., as described with respect to FIG. 3) and networks utilizing various communication technologies, as described herein.

Note that the term "latch" can refer to any single-bit memory element, including but not limited to a flip-flop or latch element. The term "protected", and thereby also "unprotected", can indicate that a latch is protected from failure in that if the latch flips from a logical 0 to a 1 or from a 1 to a 0, that the placement-driven system would recognize this and be able to report the error. The term "covered", and thereby also "uncovered", can indicate that a protection detection tool recognizes that a latch is protected. Ideally, these are the same; however, protection detection tools may report that a protected latch is not covered. The term "clock gating domain" can refer to a set of latches that use the same clocking signal, when multiple clocking signals, even at the same frequency, exist within the HDL on which the process operates. Primarily for power considerations, multiple clock gating domains can exist that allow sets of latches to be clocked or not clocked for various periods of time.

In an IC design flow the physical design flow attempts to place and route the circuit described by the HDL. In order for it to meet necessary timing, power, and area specifications, it places circuit components in advantageous locations to minimize usage of wiring, buffers, and other resources. The flow then outputs results which describe the physical design of the implemented HDL circuit. The term "PD flow" is used to describe such a flow. The term "adverse impact" is used to refer to the additional difficulty that the PD flow may encounter while attempting to produce a design that meets all of its criteria for timing, power, and area. When latches, combinational logic, and wires are added to an existing physical design, the PD flow process will need to adjust the existing physical design in order to accommodate additional components. The concept of "minimizing adverse impact" refers to the attempt to produce HDL which will minimize the additional constraints that the additional components will impart in the PD flow, thus allowing the physical design to change less while accommodating additional components.

Turning now to FIG. 1, a process flow 100 of the placement-driven system is generally shown in accordance with one or more embodiments. The process flow 100 begins at block 105, where the placement-driven system determines a plurality of lists from a circuit design. For instance, the placement-driven system is in communication with the circuit design, which includes layout information of latches, clock gating domains, wiring, etc.

At block 107, the placement-driven system can utilize one or more tools to determine which latches of the circuit design are and are not covered by parity protection, and output a list of uncovered latches. It may be more efficient for the hardware design to remove latches from this list that are already protected, in a way known to the user, that the protection detection tool cannot recognize, in order to not include duplicate protection in the design.

At block 108, after removing from this list of latches that should not be covered, this remainder of the list is parsed and compared to clock gating domain information, to create a separate list of uncovered latches for each clock gating domain. Thus, in a non-limiting embodiment, the plurality of lists from the circuit design outputted by the placement-driven system can include the lists of unprotected latches for each clock gating domain.

At block 109, the placement-driven system obtains physical design information for each latch, including but not limited to placement of latches, locations of wires, timing reports, and resource utilization. In the preferred embodiment, placement of latches is used as the primary factor.

At block 110, the placement-driven system combines the plurality of lists from the circuit design, producing one table with all of the uncovered latches and their clock gating domain and physical design information.

At block 115, the placement-driven system performs the main algorithm that will choose groupings of latches for new parity protection. For each clock gating domain, the algorithm analyzes (block 117) latches from the combined list. Based on this analysis, the algorithm chooses groupings (block 118) employed by parity checks. The groupings can further be checked (block 119) and adjusted, based on new parameters, to obtain different results. For example, the algorithm can be iteratively performed to obtain an optimized design by checking the results and adjusting the input parameters to the algorithm to obtain different groupings (note that this can be automated, such as by quantifying what is acceptable by a designer and employing statistical methods and/or machine learning). In this way, the placement information can be estimated by the designer for satisfactory results.

At block 125, the placement-driven system outputs an updated circuit design with parity protection. For instance, the algorithm outputs HDL for the chosen groupings and corresponding layout information, which can be added to an original HDL file, to describe the functional logic of the updated circuit design. In this way, the updated circuit design includes parity protection for single event upsets in control signals and other previously uncovered latches.

An operational example of the process flow 100 in accordance with one or more embodiments is now described. Note that the operation example provides error protection in a design in a Hardware Description Language (HDL) and corresponding layout information of an original HDL file via adding parity protection for any unprotected latches by considering the layout and clock gating domains to minimize the negative impacts that the additional elements would create for the design as a whole. Further, in this operation example, the unprotected latches are grouped to reduce the total length of wires required to connect all latch inputs and outputs to XOR gates that will generate the parity bit and check the parity bit, respectively.

For instance, the operation example comprises determining (see blocks 105 and 110 of FIG. 1) which latches are not covered by parity protection, thereby outputting a list of unprotected latches. In this way, the operation example removes from this list those latches that should not be additionally protected and compares the remainder of the list to clock gating domain information, to create separate sub-lists of uncovered latches for each clock gating domain. For each of these sub-lists, placement information (see block 115 of FIG. 1) is obtained for each latch, the set of all latches is analyzed, groupings are chosen that will be employed by the parity checks, inspection of the plots of the groupings are performed (along with adjustments of input parameters to obtain different plot/group results). The operation concludes when an HDL output (see block 125 of FIG. 1) for the chosen groupings is provided and added to the original HDL file that describes the functional logic.

Figure 2:
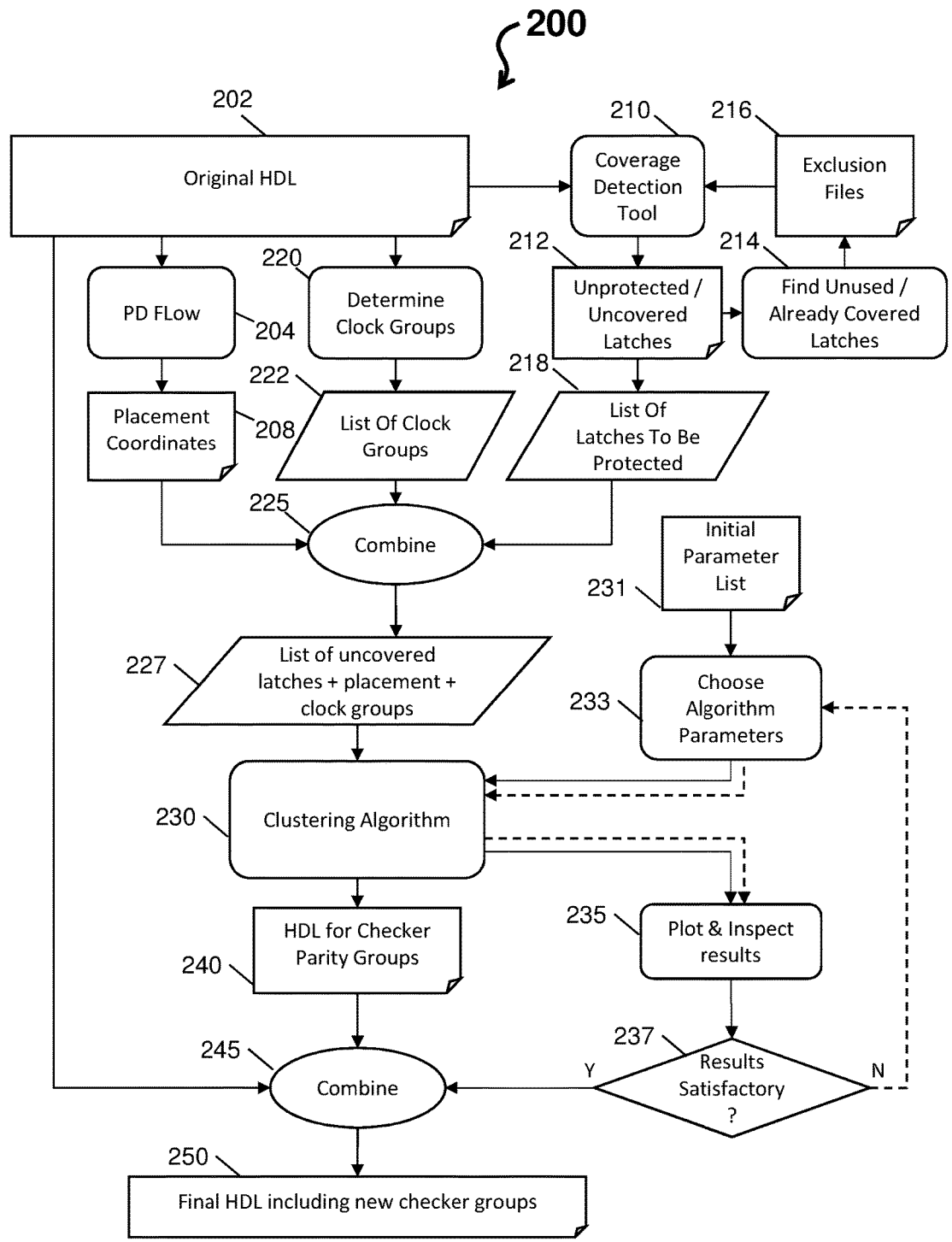
FIG. 2 depicts a process flow of placement-driven system in accordance with one or more embodiments.

Turning now to FIG. 2, a process flow 200 for providing a placement driven parity checker generation is generally shown in accordance with one or more embodiments. The process flow 200 can be implemented by the placement-driven system described herein. The process flow 200 beings at block 202 where an original HDL file(s) is received by the placement-driven system. Before initiating any effort on parity protection generation, the placement-driven system prepares the original HDL file(s) by utilizing a physical design (PD) flow (block 204) to generate a placement report indicating the coordinates of latches within the original HDL file(s) (i.e., an assignment of placement coordinates to latches, block 208).

A coverage detection tool (block 210) can be utilized to identify all unprotected latches (block 212). At blocks 214 and 216, the process flow 200 proceeds to determine which of these uncovered latches do not need to be additionally protected. For instance, the coverage detection tool can look at coverage contained within a subset of the original HDL file(s), while not recognizing that latches that may be protected elsewhere a circuit design. Some latches may exist for testing or debugging purposes and serve no function in the regular operation of the circuit design. Any latches meeting one or more of these criteria can be subject to exclusion from new protection. In turn, at block 214, the placement-driven system finds the unused latches and already covered latches. At block 216, these unused or already covered latches can be added to an exclusion file, which can be included in new/subsequent executions of the coverage tool at block 210, to prevent those latches from appearing as uncovered latches at block 212. The placement-driven system then prepares/generates a list of latches to be newly protected (block 218).

At block 220, the process flow 200 proceeds to determine to which clock gating domain each latch from the list of latches to be protected belongs to. This can be determined from the original HDL file(s) and/or other sources. The placement-driven system then prepares/generates a list of clock groups (i.e., a correspondence of all latches to their clock gating domains, block 222).

At circle 225, the process flow 200 proceeds to combine the list of latches to be protected (from block 218), the correspondence of all latches to their clock gating domains (from block 222), and the assignment of placement coordinates to latches (from block 208). A result of this combination is a table for each clock gating domain containing latches and placement. As shown in FIG. 2, the placement-driven system can output lists of uncovered latches, placement coordinates, and clock groups (227), which can be contained within a data structure such as a table.

At block 230, the placement-driven system iterates through clock gating domains and executes a clustering algorithm (e.g., physical design driven algorithm; also referred to as a clustering operation). Note that the clustering algorithm can execute for one clock gating domain at a time. Note that the clustering algorithm can execute according to physical design information. The clustering algorithm aims to group the latches geographically to minimize the amount of wire needed to connect the set of latches that will generate and check each parity bit.

Blocks 231, 233, 235, and 237 depict operations with respect to the clustering algorithm of block 230. At block 231, default algorithm parameters, including initial maximum group size, final maximum group size, span factor, and distance cutoffs, are received by the placement-driven system. The parameters can then be chosen, at block 233, either as the default values or as custom values to attempt to generate better latch groupings. Potential improvements here could include limiting the size of a tree of XOR gates needed to compute the parity, preventing excessively long wires when latches may be spaced far apart, and limiting the number of latches required to store the new parity bits. A user may provide input to the placement-driven system that enables the choosing of the parameters.

The chosen parameters are then provided (solid arrow from block 233 to block 230) to the clustering algorithm at block 230. The clustering algorithm, initially, marks all of the latches as unplaced. The clustering algorithm then determines which latch is farthest from a centroid of all unplaced latches. The centroid can be a center of mass of a geometric group cluster. This farthest latch, now marked as placed, anchors a new group of latches, which can be referred to as a current group. The clustering algorithm then determines which latch, out of those unplaced, is closest to the centroid of the latches in the current group, and adds this latch to the current group, marking it as placed. This can be repeated, to recalculate the center of the current group after each latch addition, until the initial maximum group size is reached, or until all latches have been placed in a group. The clustering algorithm then closes the current group and attempts to begin a new group. If any latches remain unplaced, the latch farthest from the center of the unplaced latches is chosen to begin the new group. This can be repeated, using this latch to anchor the new, now current group.

After all of the latches have been placed into initial groups, the clustering algorithm can reorganize the latches into better groups. The center of each group is found, and a list is produced of each latch and distance from the latch to the center of the group in which it resides. This list is sorted by decreasing distance, so that the latch farthest from the center of its own group is chosen first.

Next, the clustering algorithm then considers the next latch from the list of latches by distance. The distance from the latch to the center of its own group is compared to the distance from the latch to the center of each other group. If the latch is sufficiently far away from all of the other groups, as determined by the passed parameter for split distance, it is removed from the group it is in, and a new group is created with only that single latch. This split function can prevent excessively long wires between latches that may have been initially grouped together due to the initial group size parameter chosen or due to the layout of all of the latches. If a latch was split from its group, the split function can be viewed as finished. Otherwise, if the latch is closer to the center of another group than to its own, the latch is removed from its current group and added to the closest group. The clustering algorithm can repeat the split function until all latches have been compared and possibly moved. Because the groups may have changed significantly after implementation of the split function, the entire reorganization process can be repeated up to the number of groups that exist.

The clustering algorithm can combine groups that may be close to each other but were kept separate due to the initial maximum group size. For example, each pair of two groups is considered, and if the size of the groups is below the final maximum group size, then a span check is performed. Three spans are computed: the maximum distance between any two latches in the first group (the span of the first group), the maximum distance between any two latches in the second group (the span of the second group), and the maximum distance between any two latches in the union of the two groups (the span of the potential new group). If the span of the union group is not larger than the product of the span factor (an input parameter) and the sum of the spans of the two groups, then the groups are combined into one larger group. This span check (and span factor) ensures that two groups are not be combined if the combined group would be significantly larger in area than the original groups.

The clustering algorithm can subsequently attempt another reorganization process as defined herein to move individual latches that may not have been helped by the combining operation, even though the combining operation may have overall helped the groups.

At block 235, the clustering algorithm executes for a clock gating domain to prepare the plots of the checker groups, so that they may be checked and deemed satisfactory or not. At decision block 237, if the results are satisfactory, the clustering algorithm generates the HDL for all of the parity protection (i.e., the HDL for checker parity groups, block 240), based on the groups chosen by the clustering algorithm. At decision block 237, if the results are unsatisfactory, the process flow 200 proceeds to loop through blocks 233, 230, and 235 as shown by the dashed-line arrows. In this way, new parameters are chosen and the clustering algorithm is repeated for all clock gating domains. When the clustering algorithm has been completed for all clock gating domains, the clustering algorithm generates the HDL for all of the new parity protection, based on the groups chosen by the clustering algorithm. Note that the HDL may be checked for completeness. If desired, sufficiently small groups may be removed from the new HDL, because a small group may not provide enough of a coverage improvement to warrant the addition of a latch and combinational logic to generate and check the parity.

At circle 245, the placement-driven system combines the new HDL describing the new parity protection with the original HDL file(s), to output a final HDL including new checker groups (block 250).

Figure 3:
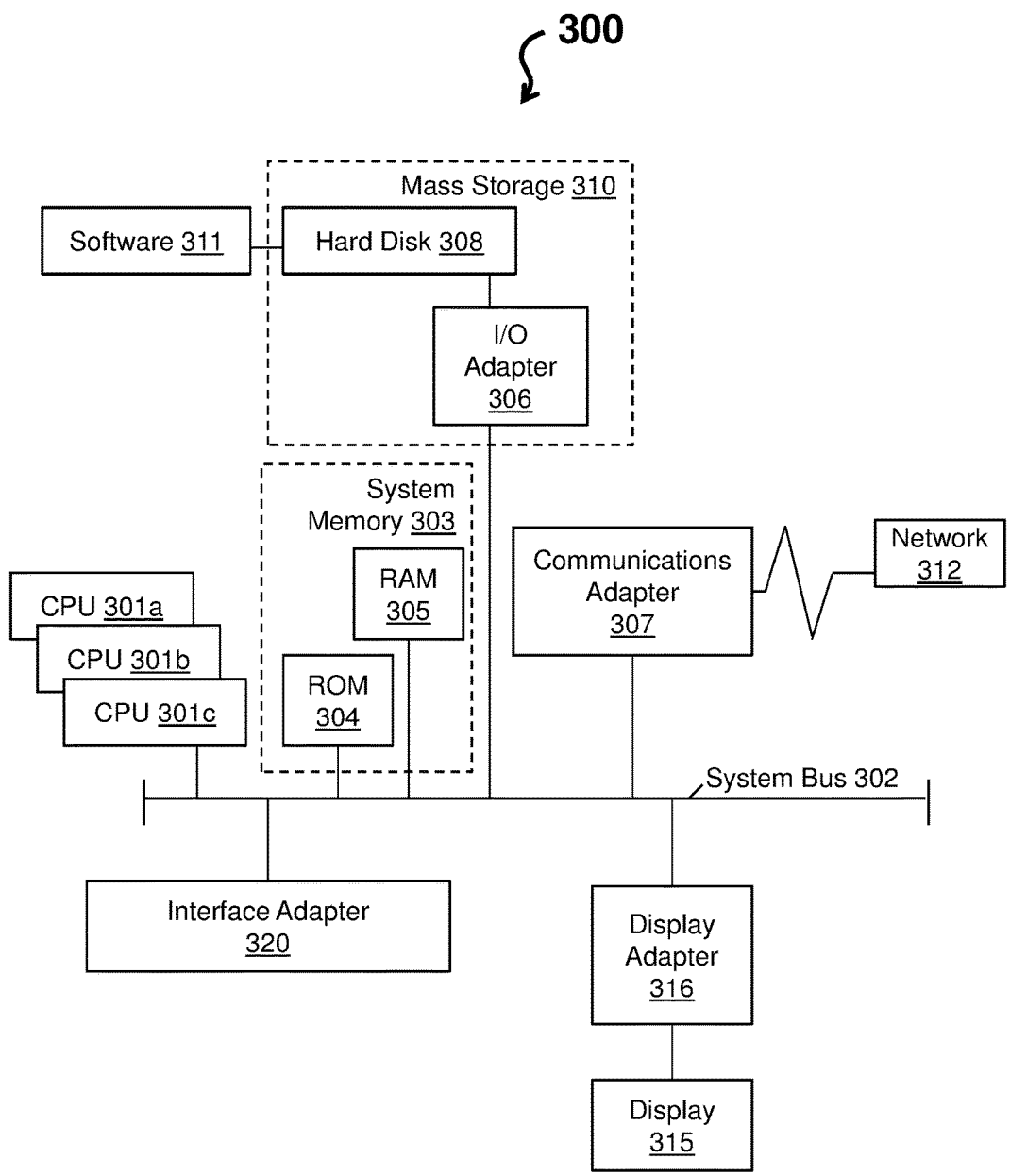
FIG. 3 illustrates a processing system in accordance with one or more embodiments.

Referring now to FIG. 3, there is shown a processing system 300 for implementing the teachings herein in accordance with one or more embodiments. For instance, the placement-driven system can be the processing system 300 comprising software, hardware, or a combination thereof. In this embodiment, the processing system 300 has one or more central processing units (CPU(s)) 301a, 301b, 301c, etc. (collectively or generically referred to as processor(s) 301). The processors 301, also referred to as processing circuits, are coupled via a system bus 302 to system memory 303 and various other components. The system memory 303 can include a read only memory (ROM) 304 and a random access memory (RAM) 305. The ROM 304 is coupled to system bus 302 and may include a basic input/output system (BIOS), which controls certain basic functions of the processing system 300. The RAM is read-write memory coupled to the system bus 302 for use by the processors 301.

FIG. 3 further depicts an input/output (I/O) adapter 306 and a communications adapter 307 coupled to the system bus 302. The I/O adapter 306 may be a small computer system interface (SCSI) adapter that communicates with a hard disk 308 and/or any other similar component. The I/O adapter 306 and the hard disk 308 are collectively referred to herein as a mass storage 310. A software 311 for execution on the processing system 300 may be stored in the mass storage 310. The mass storage 310 is an example of a tangible storage medium readable by the processors 301, where the software 311 is stored as instructions for execution by the processors 301 to perform a method, such as the process flows of FIGS. 1-2. A communications adapter 307 interconnects the system bus 302 with a network 312, which may be an outside network, enabling the processing system 300 to communicate with other such systems. A display (e.g., screen, a display monitor) 315 is connected to the system bus 302 by a display adapter 316, which may include a graphics controller to improve the performance of graphics intensive applications and a video controller. In one embodiment, the adapters 306, 307, and 316 may be connected to one or more I/O buses that are connected to the system bus 302 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to the system bus 302 via an interface adapter 320 and the display adapter 316. A keyboard, a mouse, a speaker, etc. can be interconnected to the system bus 302 via the interface adapter 320, which may include, for example, a Super I/O chip integrating multiple device adapters into a single integrated circuit.

Thus, as configured in FIG. 3, the processing system 300 includes processing capability in the form of the processors 301, and, storage capability including the system memory 303 and the mass storage 310, input means such as the keyboard and the mouse, and output capability including the speaker and the display 315. In one embodiment, a portion of the system memory 303 and the mass storage 310 collectively store an operating system, such as the z/OS or AIX operating system from IBM Corporation, to coordinate the functions of the various components shown in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for adding parity protection for any uncovered latches of a circuit design, comprising:
   determining, by a processor connected to a memory, latches that are not covered by current parity protection of the circuit design to output a list of the uncovered latches;
   executing, by the processor, a clustering operation that iteratively generates latch groupings according to physical design information and clock gating domains, and that outputs an updated design incorporating the latch groupings,
   wherein each latch grouping generates a corresponding parity bit to provide the parity protection to minimize adverse impacts on timing, routing, and power consumption of the circuit design;
   adding, by the processor, the updated design with the parity protection to the circuit design to generate a final hardware design;
   utilizing the final hardware design to describe a physical design of an implemented circuit.

2. The method of claim 1, wherein a coverage detection tool is utilized to identify the uncovered latches from unprotected latches of the circuit design.

3. The method of claim 2, wherein the coverage detection tool is utilized to identify the unprotected latches of the circuit design and determine which of the uncovered latches do not need to be protected due to protection being provided outside of the circuit design as protected latches.

4. The method of claim 3, wherein the protected latches are added to an exclusion file utilized in subsequent executions of the coverage tool to prevent the protected latches from appearing as the uncovered latches.

5. The method of claim 3, wherein a correspondence of all latches to their clock gating domains is generated with respect to the circuit design and utilized by the clustering operation to generate latch groupings.

6. The method of claim 1, wherein the clustering operation utilizes an initial set of algorithm parameters that limit a size of a tree of gates for each latch grouping.

7. The method of claim 1, wherein the clustering operation considers each latch within a latch grouping based on distance to execute a split function that prevents excessively long wires between the latches of that latch grouping.

8. The method of claim 1, wherein the clustering operation combines latch groupings that are close but had been kept separate due to an initial maximum group size.

9. A computer program product for adding parity protection for any uncovered latches of a circuit design, the computer program product comprising a computer readable storage medium having program instructions embodied therewith, the program instructions executable by a processor to cause the processor to:
   determine latches that are not covered by current parity protection of the circuit design to output a list of the uncovered latches;
   execute a clustering operation that iteratively generates latch groupings according to physical design information and clock gating domains, and that outputs an updated design incorporating the latch groupings,
   wherein each latch grouping generates a corresponding parity bit to provide the parity protection to minimize adverse impacts on timing, routing, and power consumption of the circuit design;
   add the updated design with the parity protection to the circuit design to generate a final hardware design;
   utilize the final hardware design to describe a physical design of an implemented circuit.

10. The computer program product of claim 9, wherein a coverage detection tool is utilized to identify the uncovered latches from unprotected latches of the circuit design.

11. The computer program product of claim 10, wherein the coverage detection tool is utilized to identify the unprotected latches of the circuit design and determine which of the uncovered latches do not need to be protected due to protection being provided outside of the circuit design as protected latches.

12. The computer program product of claim 11, wherein the protected latches are added to an exclusion file utilized in subsequent executions of the coverage tool to prevent the protected latches from appearing as the uncovered latches.

13. The computer program product of claim 11, wherein a correspondence of all latches to their clock gating domains is generated with respect to the circuit design and utilized by the clustering operation to generate latch groupings.

14. The computer program product of claim 9, wherein the clustering operation utilizes an initial set of algorithm parameters that limit a size of a tree of gates for each latch grouping.

15. The computer program product of claim 9, wherein the clustering operation considers each latch within a latch grouping based on distance to execute a split function that prevents excessively long wires between the latches of that latch grouping.

16. The computer program product of claim 9, wherein the clustering operation combines latch groupings that are close but had been kept separate due to an initial maximum group size.

17. A system for adding parity protection for any uncovered latches of a circuit design, comprising a processor and a memory storing program instructions thereon, the program instructions executable by a processor to cause the system to:
   determine latches that are not covered by current parity protection of the circuit design to output a list of the uncovered latches;
   execute a clustering operation that iteratively generates latch groupings according to physical design information and clock gating domains, and that outputs an updated design incorporating the latch groupings,
   wherein each latch grouping generates a corresponding parity bit to provide the parity protection to minimize adverse impacts on timing, routing, and power consumption of the circuit design;
   add the updated design with the parity protection to the circuit design to generate a final hardware design;
   utilize the final hardware design to describe a physical design of an implemented circuit.

18. The system of claim 17, wherein a coverage detection tool is utilized to identify the uncovered latches from unprotected latches of the circuit design.

19. The system of claim 18, wherein the coverage detection tool is utilized to identify the unprotected latches of the circuit design and determine which of the uncovered latches do not need to be protected due to protection being provided outside of the circuit design as protected latches.

20. The system of claim 19, wherein the protected latches are added to an exclusion file utilized in subsequent executions of the coverage tool to prevent the protected latches from appearing as the uncovered latches.

* * * * *